United States Patent [19]

Notohara et al.

[11] Patent Number: 5,359,278
[45] Date of Patent: Oct. 25, 1994

[54] ZERO CURRENT SWITCHING CIRCUIT AND CONVERTING APPARATUS USING THE SAME

[75] Inventors: Yasuo Notohara; Motoo Futami; Kazuo Tahara, Hitachi; Tsunehiro Endo, Hitachiota, all of Japan

[73] Assignee: Hitachi, Ltd., Tokyo, Japan

[21] Appl. No.: 901,212

[22] Filed: Jun. 19, 1992

[30] Foreign Application Priority Data

Jun. 19, 1991 [JP] Japan .................. 3-147095

[51] Int. Cl.⁵ .............................. G05F 1/613
[52] U.S. Cl. .............................. 323/222; 323/272; 323/282; 363/81; 363/89
[58] Field of Search .................. 363/81, 89, 124, 138; 323/222, 272, 282; H02M 3/155

[56] References Cited

U.S. PATENT DOCUMENTS 4,257,092 3/1981 Prines et al. .................. 363/124
4,719,552 1/1988 Albach et al. .................. 363/89

FOREIGN PATENT DOCUMENTS 2837405 2/1980 Fed. Rep. of Germany ...... 363/124
285960 11/1990 Japan .

OTHER PUBLICATIONS

Denshi Gijutsu ("Electronic Technologies" in English) vol. 132, No. 3; Mar. 1990; pp. 9–19.

Primary Examiner—Jeffrey L. Sterrett
Attorney, Agent, or Firm—Antonelli, Terry, Stout & Kraus

[57] ABSTRACT

A switching circuit can reduce switching power loss and can vary at least one of the switching frequency and the conduction rate of switching of the switching circuit with less dependency on a frequency of a resonating circuit. A converter unit employs the switching circuit for expansion of control range of an output voltage. A primary switching element forming the switching circuit is provided with a resonance circuit and an auxiliary switching element. With the auxiliary switching element, resonance operation is achieved. The switching circuit is applicable to switching portions of a DC-DC converter unit, an inverter or the like.

7 Claims, 10 Drawing Sheets

ED : OUTPUT VOLTAGE
ED* : OUTPUT VOLTAGE COMMAND

ED : OUTPUT VOLTAGE
ED* : OUTPUT VOLTAGE COMMAND

5,359,278

ZERO CURRENT SWITCHING CIRCUIT AND CONVERTING APPARATUS USING THE SAME

BACKGROUND OF THE INVENTION

The present invention relates to a switching circuit employing a switching element. Also, the invention relates to a DC-DC converter unit for boosting or lowering voltage from a direct current power source, a power source enhancing power factor of an alternating current power source, a DC-AC converter unit for converting current from a direct current source into a desired frequency of alternating current, and an AC-DC converter unit for converting current from an alternating current source into a direct current, employing the switching circuit of the invention.

As a conventional switching system for reducing switching loss in a switching element, a resonance type system, in which the switching element, a reactor and a capacitor are combined, has been disclosed in a Japanese Journal "DENSHI GIJUTSU" (or "Electronic Technologies"), Nikkan Kogyo Shinbun K.K., special edition, Vol. 132, No. Mar. 3, 1990, pp. 9-19. In that publication, an apparatus such as shown in FIG. 2 herein has been disclosed as a resonance type power source unit for a DC-DC converter unit for boosting current from a direct current power source.

In FIG. 2, the reference numeral 1 denotes a direct current source, 2 denotes a direct current reactor, 3 denotes a resonance reactor, 4 denotes a switching element, 5 denotes a resonance capacitor, 6 and 7 denote diodes, 8 denotes a capacitor and 9 denotes a load.

With the above-mentioned circuit construction, when the primary switching element 4 is turned OFF, a resonance current IL flowing through the resonance reactor 3 will be sinusoidal as illustrated in FIG. 3. Then, the voltage Vbe on the base of the primary switching element 4 is switched OFF during a period TB in which a reverse current is flowing through the diode 7. This makes it possible to turn OFF the switching element 40 with zero current for suppressing switching loss.

SUMMARY OF THE INVENTION

However, in the current resonance type switching circuit in the conventional system illustrated in FIG. 2, the period (TA of FIG. 3) of flow of the resonance current through the switching element is determined by the time constant of the resonance circuit. Accordingly, when the switching frequency is fixed, it becomes necessary to make the switching frequency variable so as to control the conduction rate by turning OFF the switching element in a zero current period. However, varying of the Switching frequency causes variation of the spectrum of noise associated with opening and closing of the switch, and thus is undesirable in viewpoint of noise suppression. In addition it requires designing of the magnetic parts and capacitor, which determines the size of a converter unit employing the above-mentioned switching circuit, in terms of minimum frequency. Therefore, it is difficult to reduce the size of the converter unit. In addition, even when an attempt is made to achieve variable switching frequency to provide zero current switching, the switching frequency depends on the frequency of the resonance circuit and it is not possible to vary the frequency sequentially to avoid requiring a complicated control construction.

It is an object of the present invention to provide a switching circuit which can reduce switching loss and can make at least one of a switching frequency and a conduction rate of the switching circuit variable, with reduced dependency on a frequency of a resonance circuit.

Another object of the invention is to provide a converter unit having a wide control range of the output voltage and a high efficiency, by employing the switching circuit.

According to one aspect of the invention, a reactor is connected in series with a switching circuit including a parallel connection of a primary switching element for turning ON and OFF a primary current flowing in one direction and a diode having an opposite polarity to the primary switching element, a capacitor is connected in parallel with the series circuit of the switching circuit and the reactor to constitute a resonance circuit with the reactor, and an auxiliary switching circuit is connected in series with the capacitor for performing control such that a resonance current generated by the resonance circuit flows through the diode connected in parallel to the primary switching element upon turning OFF of the switching element, in which the auxiliary switching circuit includes an auxiliary switching element and another diode having an opposite polarity to the auxiliary switching element connected in parallel with such other diode.

According to another aspect, in a DC-DC converter unit for boosting the voltage from the direct current power source, the above-mentioned switching circuit is connected in parallel with a series circuit of a direct current reactor and the direct current power source, and a series circuit of a diode and a capacitor is connected in parallel with the above-mentioned switching circuit, and the auxiliary switching element is operated cooperatively with the switching operation of the primary switching element of the switching circuit so that the direct current voltage to be applied to the capacitor reaches a predetermined value.

In the construction of the above-mentioned switching circuit, when the primary switching element is turned ON, the charge accumulated on the capacitor flows as a resonance current through the primary switching element and the diode connected in parallel to the auxiliary switching element and reversely charges the capacitor while the primary switching circuit is held ON. At this time, the auxiliary switching element in the switching circuit is held OFF, and the resonance operation terminates with the reverse charged capacitor maintaining its charges.

Next, for turning OFF of the primary switching element, the auxiliary switching element is turned ON in advance. By this, the capacitor, which is reverse charged, is electrically connected to both ends of the series circuit of the primary switching element and the reactance to provide reverse bias to the series circuit to resume a resonance operation. Then, the resonance current flows through the diode and the reactor connected in parallel to the primary switching element. While the resonance current flows through the diode, the current does not flow through the primary switching element. Therefore, by turning OFF the primary transistor during this period, zero current switching can be achieved to reduce switching loss.

Accordingly, when the switching frequency or conduction rate is to vary in the zero current switching of the primary switching element, it can be sequentially varied irrespective of the frequency of the resonance circuit by operation of the auxiliary switching element after flow of resonating current for a half period following turning ON of the variable primary switching element.

Furthermore, in a DC-DC converter unit for boosting the voltage of the direct current power source, the boosting operating is performed to accumulate energy in the direct current reactor by forming a current loop in which the current flows from the direct current power source via the direct current reactor while the primary switching element is held ON and to transfer the accumulated energy to the output side capacitor. Here, when the primary switching element of the switching circuit is turned ON, the resonance current in the current of the primary switching element is interrupted, after a half period of the resonance current, by the auxiliary switching element, and subsequently flows from the direct current power source through .the direct current reactor until the primary switching element is turned OFF. By varying the timing for turning off the primary switching element, i.e. the conduction rate, the direct current output voltage is controlled. With this unit, even when the switching frequency is fixed, the conduction rate with zero current switching can be varied irrespective of the resonance frequency by the operation of the auxiliary switching element. Thus, the range for controlling the output voltage can be widened, and the unit can enjoy higher efficiency.

Furthermore, by providing the resonance circuit and the auxiliary switching element for the primary switching element forming the switching circuit, zero current switching can be performed irrespective of the frequency of the resonating circuit. In addition, by applying such switching circuit for various converter units, the conduction rate can be made variable without depending upon the resonance circuit by the operation of the auxiliary switching element, even when the switching frequency is set to be fixed. This ensures a wider range of output voltage control and contributes to reduction of the size of the unit and increase of the efficiency thereof.

DESCRIPTION OF THE PREFERRED EMBODIMENTS

Figure 1:
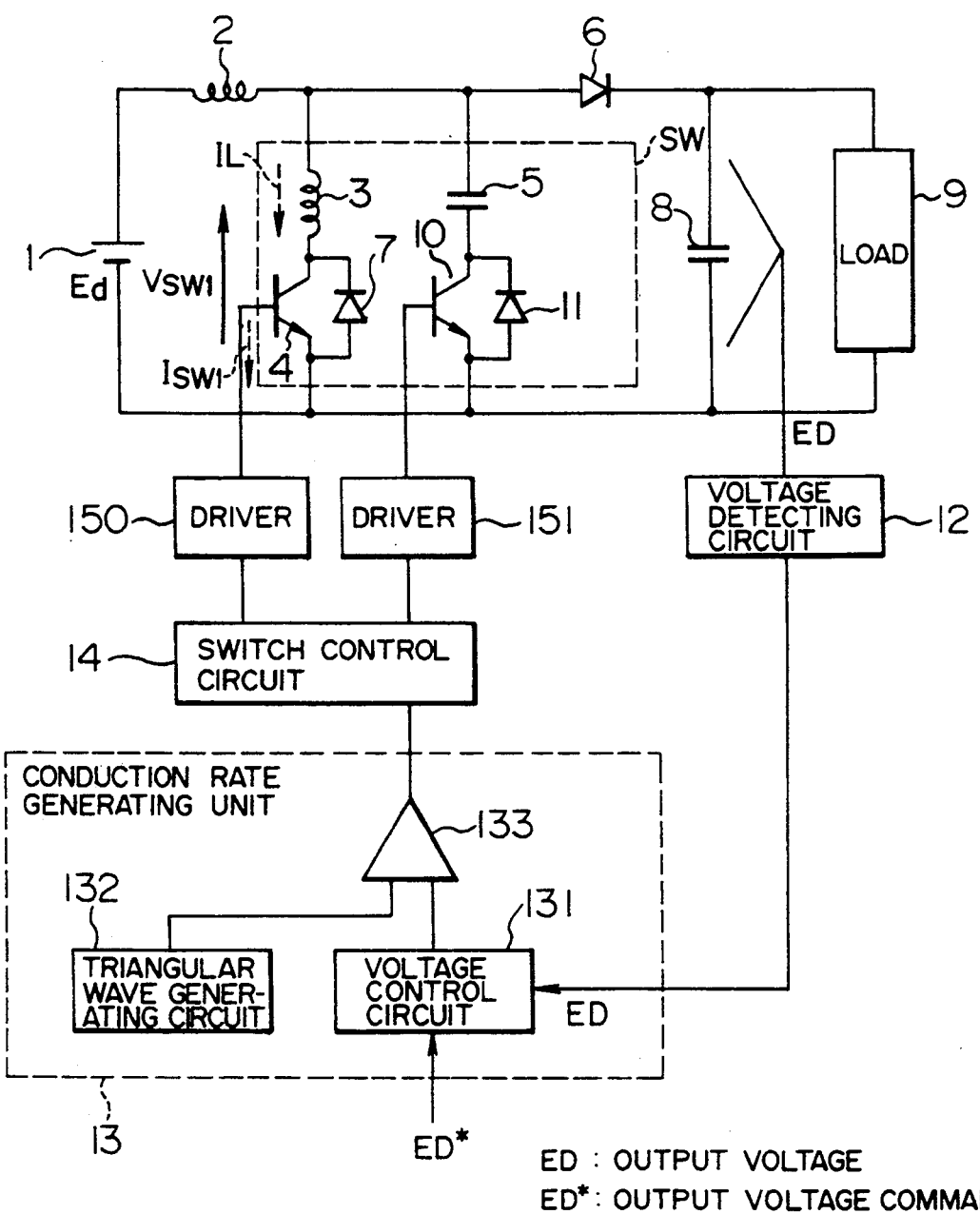
FIG. 1 is a block diagram of one embodiment of a booster type DC-DC converter unit according to the present invention.
Figure 2:
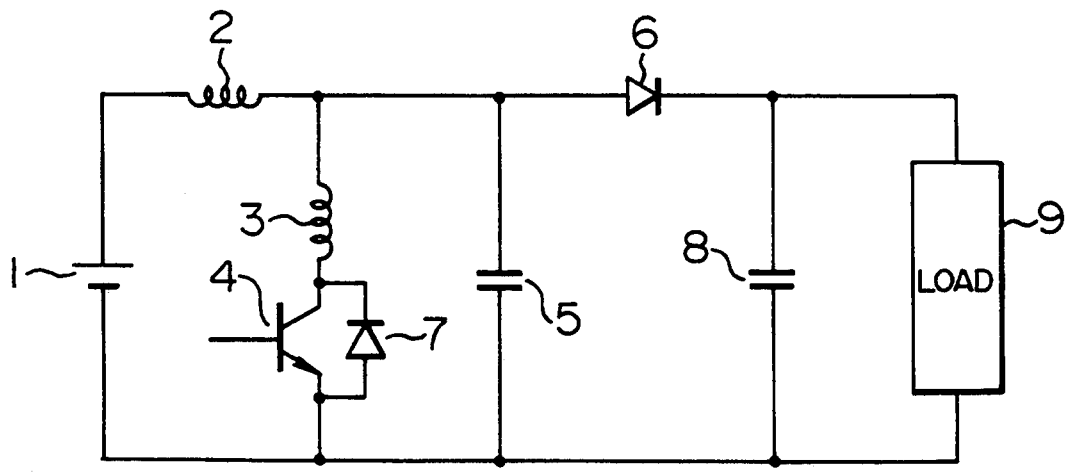
FIG. 2 is a diagrammatic illustration of a conventional booster type resonance power source unit.
Figure 3:
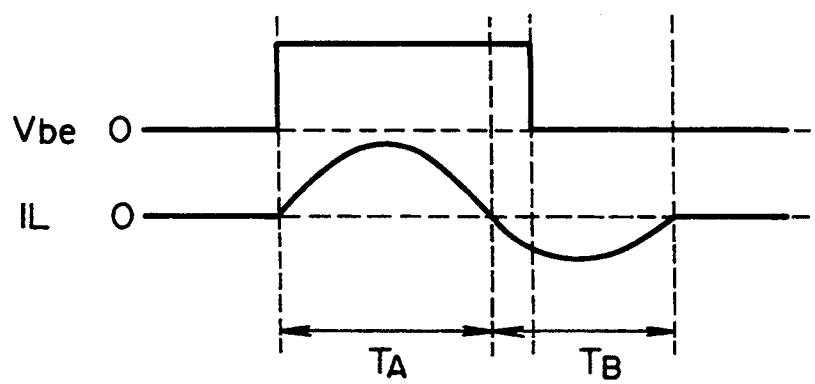
FIG. 3 is a chart showing operational waveforms of the conventional switching circuit.

One embodiment of the present invention will be described herebelow with reference to FIGS. 1, 4A, 4B and 5. FIG. 1 shows a construction of a booster type DC-DC converter unit employing a switching circuit according to the present invention.

Current Ed from a direct current power source 1 is converted into a boosted direct current ED via a surge preventing diode 6 and a capacitor 8 by a boosting chopper circuit utilizing switching operation of a switching circuit SW and an energy accumulation effect of a direct current reactor 2, and is then supplied to a load 9.

Here, the switching circuit SW for turning ON and OFF the current has a transistor 4 as a primary switching element. A resonance reactor 3 is connected in series with the transistor 4. A diode 7 is connected in parallel with the transistor 4. A series circuit of a resonance capacitor 5 and a transistor 10, as an auxiliary switching element, are connected in parallel with the series circuit of the transistor 4 and the resonance reactor 3. A diode 11 is connected in parallel with the auxiliary transistor 10. It should be noted that the sizes of the resonance reactor 3 and the resonance capacitor 5, which form a resonance circuit, are determined by a circuit constant setting method discussed later.

A control means for controlling the direct current voltage ED at a predetermined voltage, includes a voltage detecting circuit 12 for detecting the direct current voltage ED, a conduction rate generating unit 13 for generating a conduction rate so that the difference between an output voltage command ED* and the output of the voltage detecting circuit 12 becomes zero, a switching control circuit 14 for outputting an operation signal for each transistor according to the conduction rate generated by the conduction rate generating unit 13, and drivers 150 and 151 for driving the transistor 4 and the auxiliary transistor 10.

The conduction rate generating unit 13 includes a voltage control circuit 131 for generating a conduction ratio signal so that the difference between the output voltage command ED* and the output of the voltage detecting circuit 12 becomes zero, a triangular wave generating circuit 132 and a comparator 133 for comparing the conduction rate signal and the triangular wave to output the conduction rate.

Figure 4A:
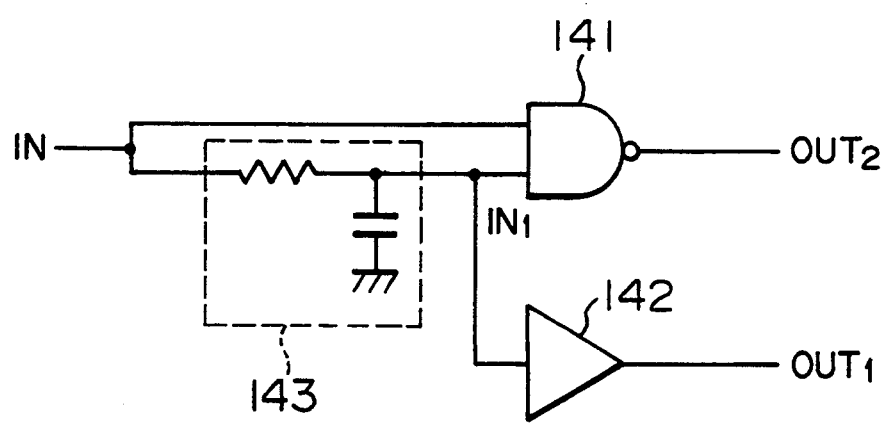
FIGS. 4A and 4B show, respectively, the construction of an operational waveforms in one embodiment of a switching circuit according to the present invention.
Figure 4B:
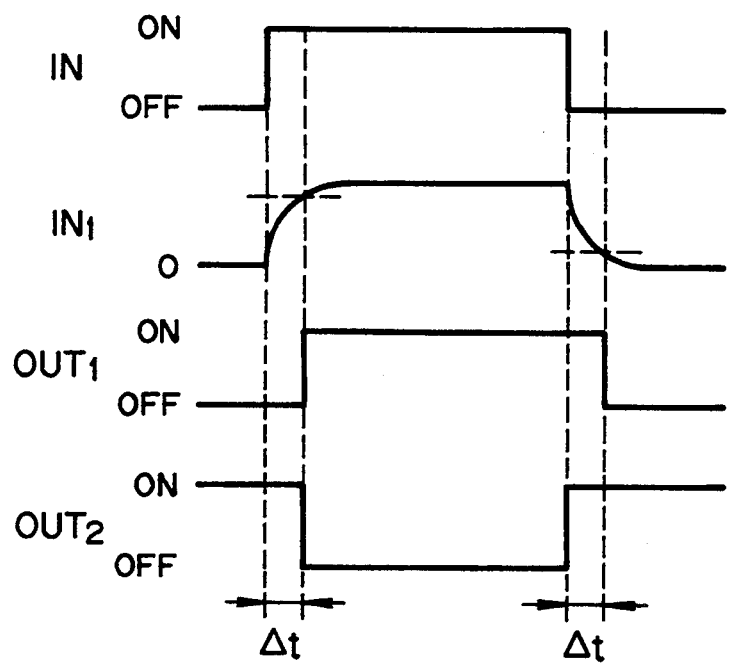

FIG. 4A shows a construction of the switching control circuit 14 for operating the transistor 4 and the auxiliary transistor 10 in the switching circuit SW. FIG. 4B shows operational waveforms in the switching control circuit. The switching control circuit 14 includes a NAND circuit 141, a buffer circuit 142 and a delay circuit 143 having a resistor and a capacitor.

A signal IN to be applied to the switching control circuit, namely, the conduction rate of the transistor 4, is branched so that it is directly input to the NAND circuit 141, and it is inputted to the delay circuit 143 and thus becomes a delayed signal IN1 having a delay $\Delta t$ to be inputted to the NAND circuit 141 and the buffer circuit 142. The outputs OUT1 and OUT2 of the buffer circuit 142 and the NAND circuit 141, respectively, become operation signals for the transistor 4 and the auxiliary transistor 10. Delay $\Delta t$ is set for one fourth period of a resonance period for the reason described later.

It should be appreciated that although the delay circuit 143 is formed by an analog circuit in FIG. 4A, $\Delta t$ can be accurately set by forming the delay circuit 143 with a digital circuit, such as a latch circuit.

With the switching control circuit as set forth above, the switching timing signals for the transistor 4 and the auxiliary transistor 10 are generated in the following manner. With regard to turning ON of the transistor 4, a turn-OFF signal OUT2 for the auxiliary transistor 10 is generated simultaneously with generation of the turn-ON signal OUT1 for transistor 4. With regard to turning-OFF of the transistor 4, the turn-ON signal for the auxiliary transistor 10 is generated earlier by one fourth of the resonance period of the resonance circuit than the generation of the turn-OFF signal OUT1 for the transistor 4.

It should be noted that, in the switching control circuit 14, it is possible to detect the current flowing through the transistor 4 to turn OFF the transistor 4 when the current becomes zero. In this case, it becomes unnecessary to set $\Delta t$ at one fourth of the resonance period. Therefore, the switching control circuit can be simplified.

Next, the operation of the construction of the switching circuit and apparatus will be discussed.

Figure 5:
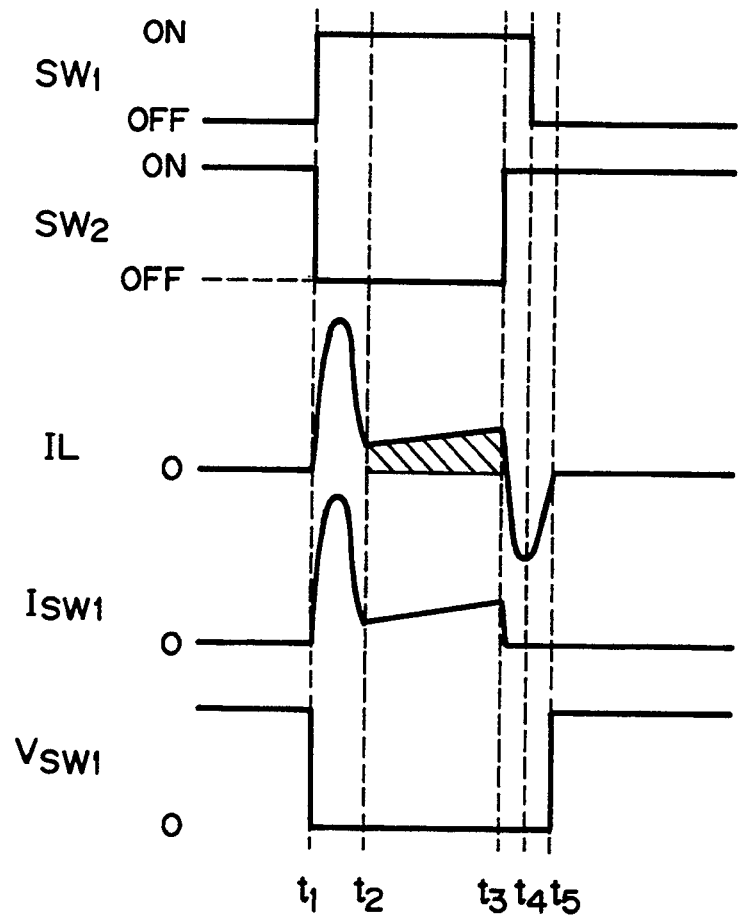
FIG. 5 is a chart showing operational waveforms of one embodiment of a switching timing circuit according to the present invention.

FIG. 5 shows operational waveforms of the switching circuit. In FIG. 5, SW1 and SW2 illustrate waveforms of operation signals for, respectively the transistor 4 and the auxiliary transistor 10, IL illustrates a waveform of the current flowing through the resonance reactor 3, and ISW1 and VSW1 illustrate the current and the voltage of the transistor 4.

At first, the transistor 4 turns ON and the transistor 10 turns OFF at a timing t1. Then, the direct current power source 1 is applied to the direct current reactor 2 and the reactor 3. Under this condition, the voltage of the charged capacitor 5 is applied to the reactor 3. Therefore, the resonance current flows through a loop formed through the reactor 3, the transistor 4 and the diode 11. As a result, the capacitor 5 is reverse charged. It should be noted that the voltage to which the capacitor 5 is charged is equal to the direct current voltage ED, and the current from the direct current source 1 will not flow through the direct current reactor 2 until the voltage level of the capacitor 5 drops below the voltage level Ed of the direct current source 1.

At the end of a half period t2 of the resonance period of the resonance circuit, reverse charging of the capacitor 5 is completed. Then, capacitor 5 is brought into a state for discharging by flowing of reverse current. However, since reverse current from the capacitor 5 is blocked by the diode 11, the capacitor 5 is electrically disconnected from the circuit with the reverse charged state maintained to interrupt resonating operation.

Here, in the period of time when the voltage of the capacitor 5 falls below the voltage of the direct current source 1 to the time (t3) when the transistor 10 turns ON, an input current from the direct current source 1 flows through the direct current reactor 2, the reactor 3 and the transistor 4 (hatched portion in the drawing of the current IL in FIG. 5) so that the electromagnetic energy is accumulated in the direct current reactor 2.

When the transistor 10 turns ON at a time t3, the capacitor 5, which is held in the electrically disconnected state, is connected. Therefore, the reverse voltage of the charged capacitor 5 is applied to the transistor 4 and the reactor 3 and a resonance current flows in a direction opposite to the above-described direction through the diode 7 and the reactor 3. By this, a resonance operation is resumed. At this time, the capacitor 5 is recharged.

The transistor 4 is turned OFF at a time t4 between t3 and t5 while the resonance current flows through the diode 7.

When charging of the capacitor 5 is completed at the timing t5, the capacitor 5 is again brought into the condition to discharge. However, because the current is blocked by the diode 7, resonance operation is interrupted. The direct current power source 1 and the voltage generated by the direct current reactor 2 are applied to the transistor 4.

At this time, the energy accumulated in the direct current reactor 2 is discharged to the capacitor 8 through the diode 6. Thus, the direct current output voltage can be boosted.

Through the operation as set forth above, since the transistor 4 of the switching circuit is turned OFF in a period in which the voltage VSW1 and the current ISW1 do not overlap, within the period between t3 and t5, switching without switching loss is possible. Also, upon turning OFF of the auxiliary transistor 10, resonance operation is terminated at time t1, and charging of the capacitor 5 is completed so that no current will flow, and the diode 11 is held in the conductive state. Therefore, switching with substantially no switching loss becomes possible. Accordingly, provision of the transistor 10 does not cause increase of the switching loss.

Further, the effect achieved by providing the auxiliary transistor in the resonance circuit is to widen the range of output control for the direct current voltage, since the current continues to flow through the direct current reactor 2, the reactor 3 and the transistor 4 from the direct current source until the auxiliary transistor 10 turns ON, even after terminating of resonance operation at a half period of the resonance period from initiation of resonance operation by turning ON of the transistor 4, and thereby the direct current reactor 2 can accumulate the energy for the extra period.

It should be noted that although the foregoing discussion has been given for a case in which the transistor 10 is turned off at the same time that the transistor 4 is turned ON, the turning-OFF of the transistor 10 can be selected for any time within a period after completion of recharging of the capacitor 5 (t5) until completion of reverse charging by turning ON of the transistor 4. Namely, it is possible to turn the transistor 10 OFF within the half period of the resonance period about the timing t1.

On the other hand, before t1, the power is supplied to the load via the direct current reactor 2 and the diode 6. Therefore, the current does not flow through the reactor 3 and the transistor 4. Therefore, the transistor 4 can be turned ON with zero current.

By repeating the foregoing operation according to the conduction rate, it becomes possible to perform zero current switching without depending upon the resonance frequency. Therefore, with the resonating frequency and the switching frequency fixed, the output voltage can be controlled within a wide range by varying the conduction rate with simple circuit construction.

Here, the characteristic impedance Zn of the resonance circuit formed by the resonance reactor 3 and the resonance capacitor 5 of the switching circuit is determined so as to satisfy the conditions for effecting zero current switching. Namely, the characteristic impedance Zn can be expressed by the following equation with the voltage Vc of the resonance capacitor and the maximum peak current Ip which flows upon turning ON of the transistor 4 as the primary switching element:

$$Zn \leq Vc/Ip$$

Namely, it is required to accumulate energy during reverse charging for canceling the maximum peak current Ip flowing upon ON timing of the primary switching element, in other words, the electromagnetic energy to be accumulated in the resonating reactor. Therefore, the time constant of the resonance circuit has to be so selected as to satisfy the foregoing equation.

It should be appreciated that although the described embodiment employs the transistor as the switching element, when a FET is employed as the switching element, the diode connected in parallel to the transistor, can be a parasitic diode of the FET. On the other hand, equivalent operation can be achieved by employing an IGBT (Insulated Gate Bipolar Transistor). In such case, further higher speed switching will be expected.

Figure 6:
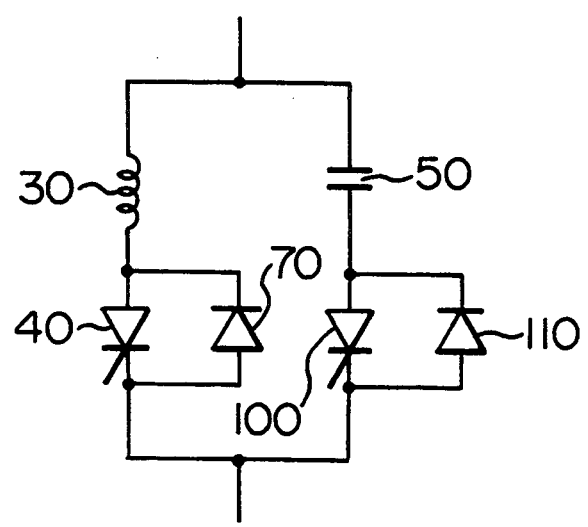
FIG. 6 is a circuit diagram of another embodiment of a thyristor turn OFF circuit according to the present invention.

FIG. 6 shows another embodiment of the present invention, in which the transistor in the switching circuit of the former embodiment is replaced with a thyristor.

In this circuit construction, a resonance reactor 30 is connected in series with a primary thyristor 40. Also, a diode 70 is connected in parallel with the primary thyristor 40. On the other hand, for the auxiliary thyristor 100, a resonance capacitor 50 is connected in series and a diode 110 is connected in parallel. A series circuit of the primary thyristor 40 and the resonance reactor 30 is connected in parallel to the series circuit of the auxiliary thyristor 100 and the resonance capacitor 50.

Figure 7:
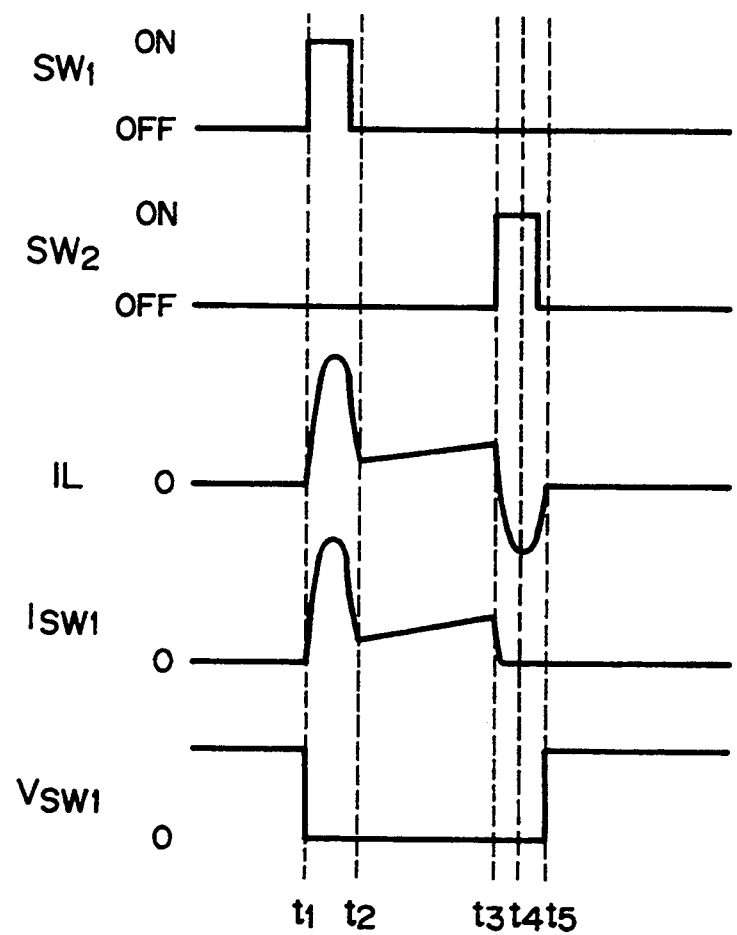
FIG. 7 is a chart showing operational waveforms of one embodiment of the thyristor turn OFF circuit according to the invention.

FIG. 7 shows the switching timing and the operational waveform of the circuit of FIG. 6. Similarly to FIG. 5, zero current switching is possible by turning ON the auxiliary thyristor 100 in advance of the turn OFF time, by a period one fourth of the resonance frequency, after turning ON of the primary thyristor 40. Although a thyristor has no function for self-turn OFF, it can be turned OFF by applying reverse bias to the thyristor by the resonance circuit and the auxiliary switching circuit. In other words, the resonance circuit and the auxiliary switching circuit also form the turning OFF circuit for the thyristor 40.

It should be noted, although a thyristor is employed as the auxiliary switching element in the shown embodiment, it is possible to employ the switching element of the transistor or so forth for achieving the similar effect.

Figure 8:
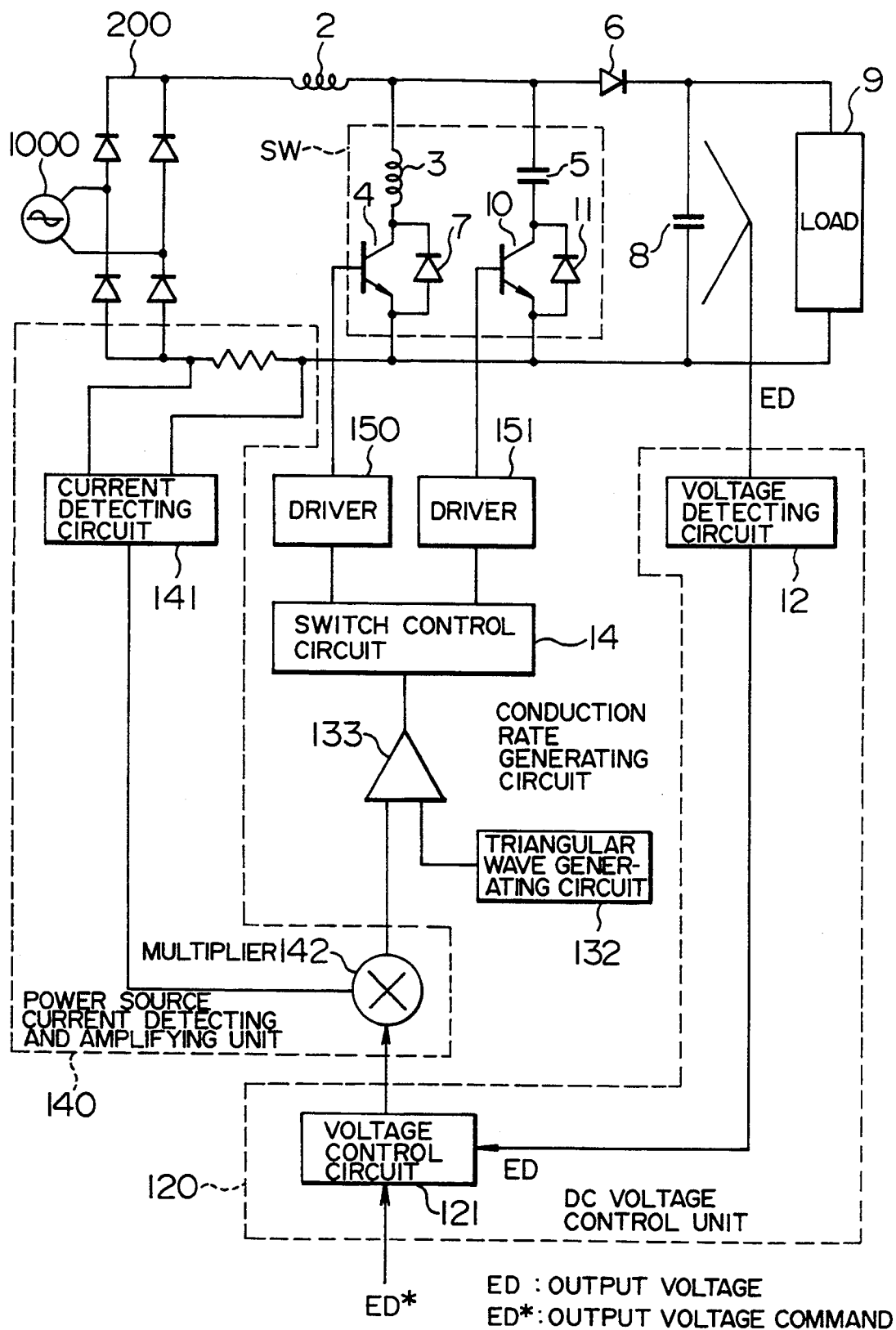
FIG. 8 is a block diagram of a further embodiment of a power factor enhancing power source unit according to the present invention.

FIG. 8 shows a further embodiment of the present invention, in which the first embodiment of the switching circuit is applied to a power factor enhanced power source unit. In the following description, the similar elements to those shown in FIG. 1 will be represented by the same reference numerals and perform the equivalent operations. The shown embodiment is differentiated from the first embodiment by means for the determining the conduction rate to be provided for the transistor. The following description will concentrate on this point.

A power source current detecting and amplifying unit 140 includes a current detecting circuit 141 for detecting the power source current, and a multiplier 142 for amplifying the output value of the current detecting circuit 141. The multiplier 142 outputs a conduction rate command signal defining a time duration for which the transistor 4 of the switching circuit SW is kept turned OFF.

A direct current voltage control unit 120 includes a voltage detecting circuit 12 and a voltage control circuit 121 for outputting an amplification degree signal for the power source current detecting and amplifying unit 140 so that the difference between the output of the voltage detecting circuit 12 and a direct current voltage command value ED* becomes zero.

A conduction rate generating circuit 133 comprises a comparator outputting the conduction rate by comparing a triangular wave of a triangular wave generating circuit 132 and the conduction rate command signal from the power source current detecting and amplifying unit 140.

By controlling the switching circuit SW according to the output of the conduction rate generating circuit 133 in a similar manner to the first embodiment, the power factor enhanced power source unit, which can perform zero current switching operation and can have wide direct current voltage control range, can be provided even when the frequency of the triangular wave generating circuit 132 is fixed.

Next, description will be given of the operation for enhancing the power factor. By detecting the waveform in the half cycle of the power source current, setting the conduction rate of the switching element high when the power source current does not flow, and setting the conduction rate of the switching element small when excess power source current flows, the power source current will have a sinusoidal waveform in synchronism with the power source voltage. Therefore, the power factor can be enhanced.

It should be noted that although the shown embodiment detects the power source current at the output side of a rectifier circuit 200 for rectifying current from an alternating current source 1000, it is, of course, possible to detect the power source current at the input side of the rectifier 200.

Figure 9:
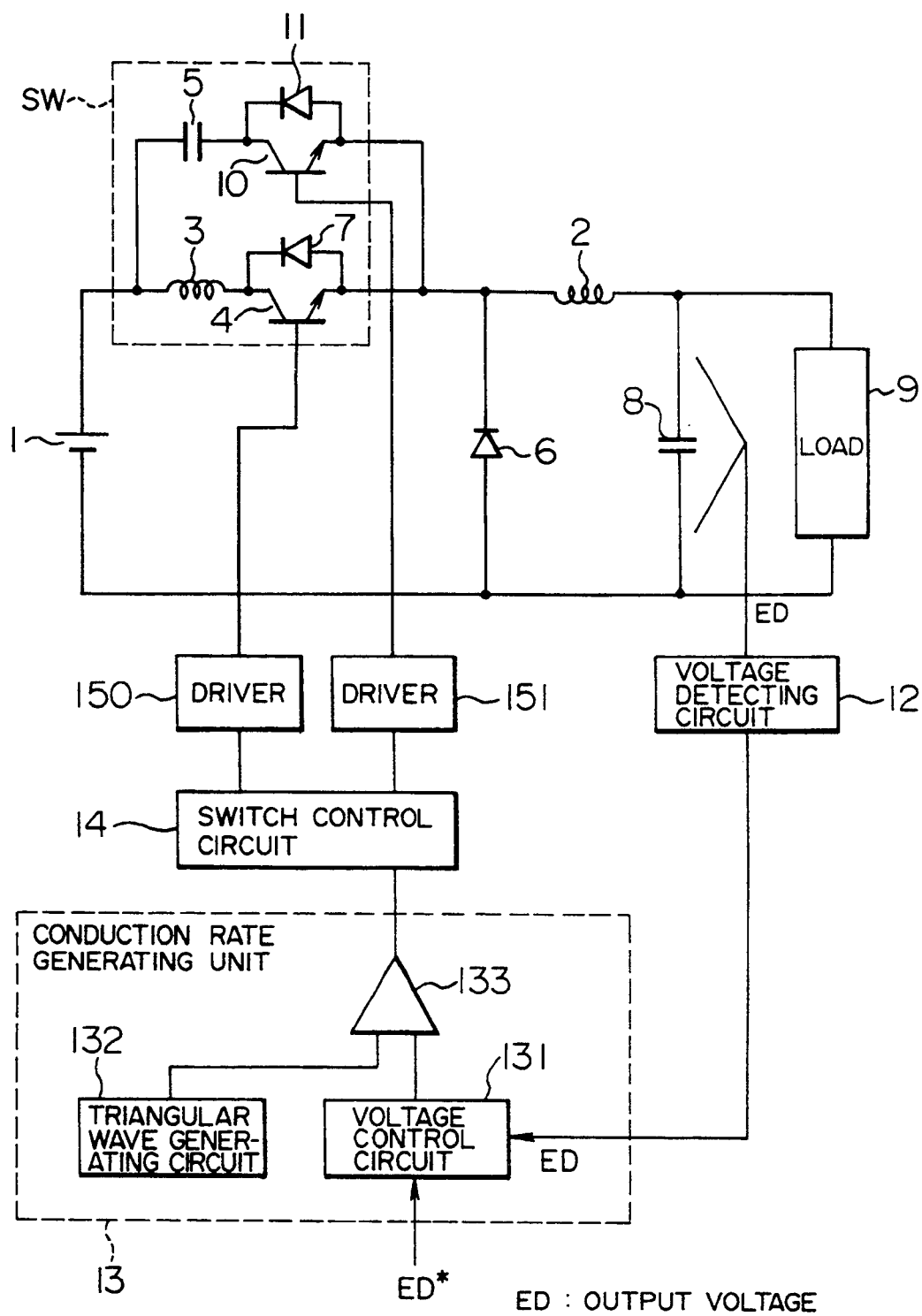
FIG. 9 is a block diagram of a still further embodiment of a voltage lowering type DC-DC converter unit according to the present invention.

FIG. 9 shows a still further embodiment of the present invention, in which the switching circuit of the present invention is applied to voltage drop type DC-DC power source unit. In the description of the shown embodiment, similar elements to those shown FIG. 1 will be represented by the same reference numerals.

In the construction of the shown embodiment, a diode is connected in parallel with a series circuit of the switching circuit and the direct current source. Further, the above-mentioned diode is connected to a series circuit of the reactor and the capacitor. The switching circuit is operated so that the direct current voltage to be applied to the capacitor reaches a predetermined value and thus controls voltage drop of the direct current power source.

It should be noted that the zero current switching operation is the same as that described with respect to the first embodiment, and thus the description will be omitted. However, it should be appreciated that with the shown embodiment, the equivalent effect to the first embodiment of FIG. 1 can be achieved.

Figure 10:
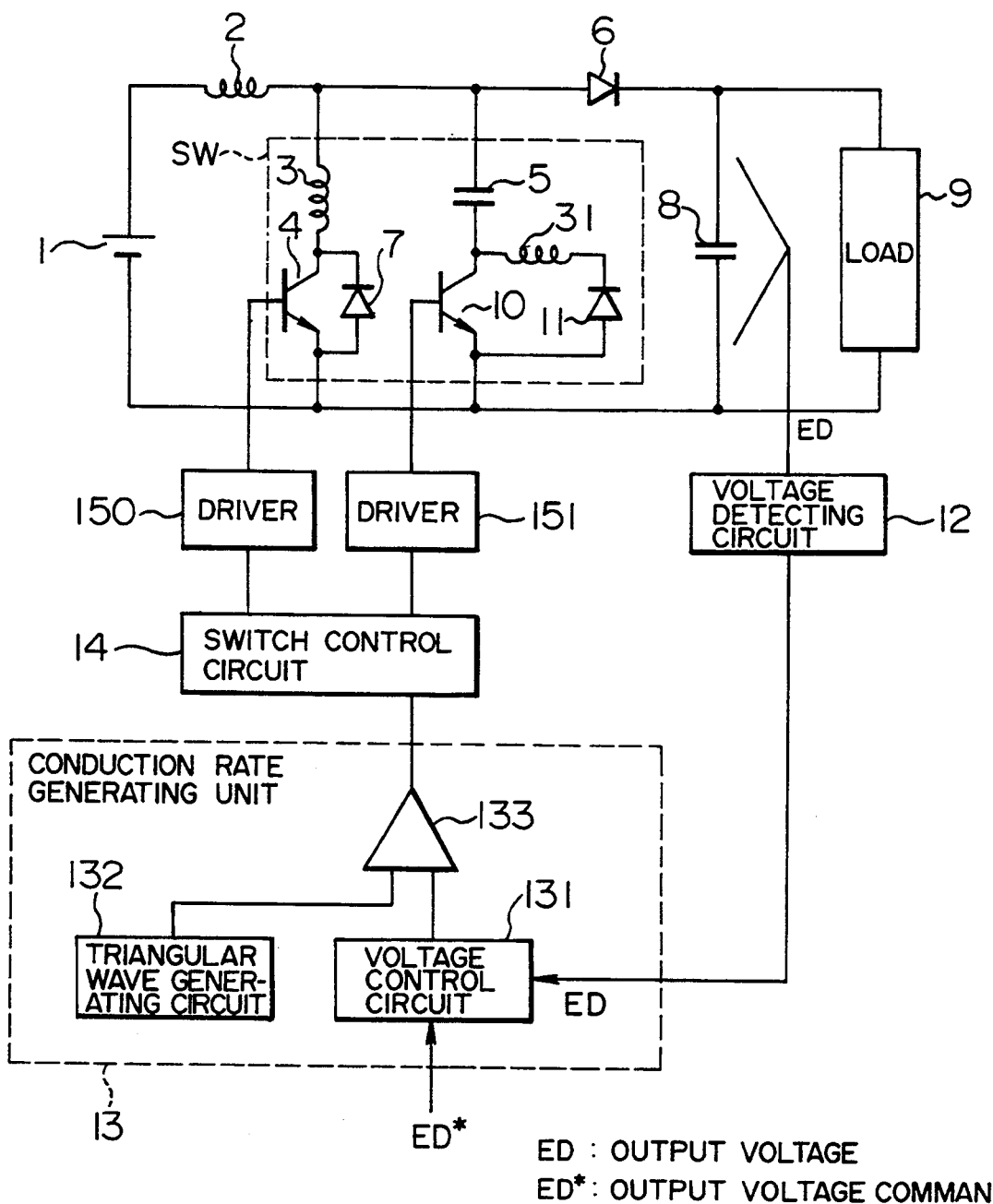
FIG. 10 is a block diagram of a yet further embodiment of a booster type DC-DC converter unit according to the present invention.

FIG. 10 shows a yet further embodiment of the present invention, in which the switching circuit in the foregoing first embodiment of the boosting type DC-DC converter unit is further improved. The same reference numerals of FIG. 1 represent similar elements performing the same operation.

The shown embodiment is differentiated from the first embodiment due to the switching circuit having a plurality of distributed resonance reactors. In the shown embodiment, the resonance reactor 3 is connected in series with the primary transistor 4, and a resonance reactor 31 is connected in series to the diode 11. Because of this, when the transistor 4 is turned ON, a loop for flow of the resonance current is established through both of the reactor 3 and the reactor 31. When the transistor 10 turns ON immediately before turning OFF of the transistor 4, a loop for flow of the resonance current is established only through the reactor 3. This differentiates the characteristic impedance and resonance frequency between the former resonance operation and the latter resonance operation and thus makes the impedance of the resonance circuit established in the former mode greater than that of the latter.

Figure 11:
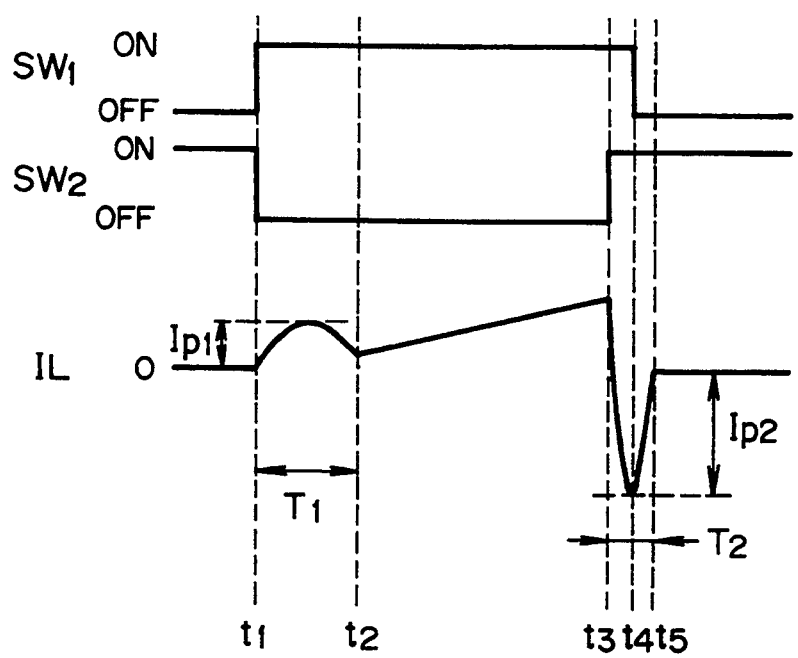
FIG. 11 is a chart showing operational waveforms of the switching circuit illustrated in FIG. 10.

FIG. 11 shows the switching timing and the operational waveform of the embodiment of FIG. 10. As illustrated, the peak value Ip1 of the resonance current associated with the resonance operation (from t1 to t2), upon turning ON of the transistor 4, can be lowered relative to the peak value Ip2 of the resonance current associated with the resonance operation (from t3 to t5) upon turning ON of the transistor 10 immediately ahead of turning OFF of the transistor 4. It should be noted that, since the resonance period upon turning ON and OFF of the transistor 4 is differentiated as T1 and T2, it becomes necessary to select the resonance frequency so as not to influence the direct current voltage control.

As set forth, with the shown embodiment, since the peak value of the resonance current, which is a defect of the current resonance type, can be lowered, loss created at the resonance circuit can be reduced so as to achieve further suppression of the switching loss in comparison with that in the first embodiment. In addition, since a switching element with smaller current capacity can be used, it may contribute to reduction of size and cost of the unit.

Figure 12:
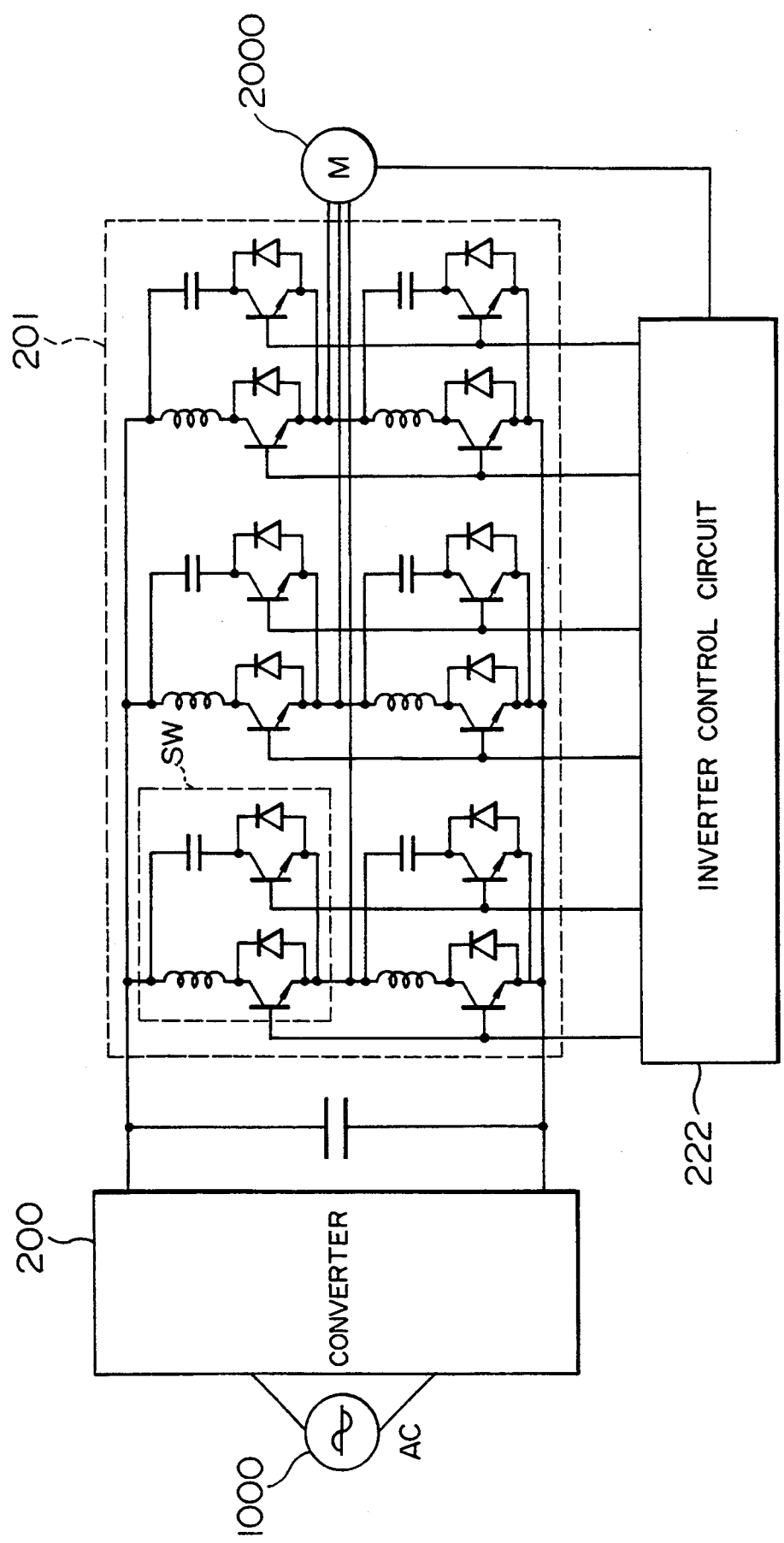
FIG. 12 is schematic block diagram showing a motor control unit, in which one embodiment of the switching circuit according to the present invention is employed.

FIG. 12 is a still further embodiment of the present invention, in which the switching circuit as described in the first embodiment is employed as a switching element portion of an inverter unit for converting a direct current of a motor control unit into an alternating current. The shown motor control unit comprises a converter 200 for converting current from the alternating current power source 1000 into a direct current, an inverter 201 for converting the direct current into an alternating current with a variable frequency and variable voltage, and an inverter control circuit 222 for controlling the switching elements of the switching circuits SW in the inverter 201 between ON and OFF. In such inverter 201, since a plurality of switching elements are required, loss to be caused by respective switching operation will be substantial. However, by employing the switching circuit described above at respective parts, switching loss can be significantly reduced. Therefore, the effect of the present invention becomes significant in such units. Therefore, the inverter unit can achieve higher efficiency.

It should be noted that, though the shown embodiment employs the switching circuit in the inverter unit, it is also possible to employ the described switching element as the switching element in the converter for converting current from the alternating current power source 1000 into direct current to achieve a similar effect.

What is claimed is:

1. An AC-DC converter unit comprising a bridge circuit including:

a primary switching element for turning ON and OFF a primary current, said primary switching element permitting flow of the primary current in a single direction only;

a first diode connected in parallel with said primary switching element with a polarity permitting current flow in a direction opposite to the single direction of current flow through said primary switching element, to constitute a switching circuit;

a first reactor connected in series with said switching circuit;

an auxiliary switching circuit including an auxiliary switching element and a second diode, said auxiliary switching element permitting current flow in a single direction only, said second diode connected in parallel with said auxiliary switching element and having a polarity permitting current flow in a direction opposite to the single direction of current flow through said auxiliary switching element; and a first capacitor connected in series with said auxiliary switching circuit, the series connection of said first capacitor and said auxiliary switching circuit connected in parallel with the series connection of said switching circuit and said first reactor, such that said first capacitor and said first reactor constitute a resonance circuit, and a resonance current generated by said resonance circuit flows through said first diode upon turning OFF of said primary switching element;

said bridge circuit adapted for connection to an alternating current power source for operating said primary switching element and for operating said auxiliary switching element of said bridge circuit to convert alternating current from the alternating current power source into a direct current.

2. A switching network comprising:

a primary switching element for turning ON and OFF a primary current, said primary switching element permitting flow of the primary current in a single direction;

a first diode connected in parallel with said primary switching element with a polarity permitting current flow in a direction opposite to the single direction of current flow through said primary switching element, to constitute a switching circuit;

a reactor connected in series with said switching circuit;

an auxiliary switching circuit including an auxiliary switching element and a second diode, said auxiliary switching element permitting current flow in a single direction only, said second diode connected in parallel with said auxiliary switching element with a polarity permitting current flow in a direction opposite to the single direction of current flow through said auxiliary switching element; and a capacitor connected in series with said auxiliary switching circuit, the series connection of said capacitor and said auxiliary switching circuit connected in parallel with the series connection of said primary switching circuit and said reactor, such that said capacitor and said reactor constitute a resonance circuit, said first diode limits charge and discharge operations of said capacitor, a resonance current generated by said resonance circuit flows through said first diode upon turning OFF of said primary switching element, and the turning OFF of said primary switching element occurs after the turning ON of said auxiliary switching element, wherein said resonance circuit includes a loop, formed upon turning ON of said primary switching element, having an impedance greater than the impedance of a loop of said resonance circuit formed upon turning OFF of said primary switching element.

3. A switching network as set forth in claim 2, wherein said resonance circuit includes a reactance member and a capacitor, with a reactance of the loop of said resonance circuit formed upon turning-ON of said primary switching element being greater than the reactance of the loop of said resonance circuit formed upon turning-OFF of said primary switching element.

4. A DC-AC converter unit comprising a bridge circuit including:
  a primary switching element for turning ON and OFF a primary current, said primary switching element permitting flow of the primary current in a single direction only;
  a first diode connected in parallel with said primary switching element with a polarity permitting current flow in a direction opposite to the single direction of current flow through said primary switching element, to constitute a switching circuit;
  a first reactor connected in series with said switching circuit;
  an auxiliary switching circuit including an auxiliary switching element and a second diode, said auxiliary switching element permitting current flow in a single direction only, said second diode connected in parallel with said auxiliary switching element and having a polarity permitting current flow in a direction opposite to the single direction of current flow through said auxiliary switching element; and
  a first capacitor connected in series with said auxiliary switching circuit, the series connection of said first capacitor and said auxiliary switching circuit connected in parallel with the series connection of said switching circuit and said first reactor, such that said first capacitor and said first reactor constitute a resonance circuit, and a resonance current generated by said resonance circuit flows through said first diode upon turning OFF of said primary switching element;
  said bridge circuit adapted for connection to a direct current power source for operating said primary switching element and for operating said auxiliary switching element of said bridge circuit to convert direct current from the direct current power source into an alternating current.

5. A DC-DC converter unit for boosting voltage from a direct current power source, comprising a first reactor adapted to be connected in series with the direct current power source; a first diode; a first capacitor connected in series with said first diode; and a switching network including:
  a primary switching element for turning ON and OFF a primary current, said primary switching element permitting flow of the primary current in a single direction only;
  a second diode connected in parallel with said primary switching element with a polarity permitting current flow in a direction opposite to the single direction of current flow through said primary switching element, to constitute a switching circuit;
  a second reactor connected in series with said switching circuit;
  an auxiliary switching circuit including an auxiliary switching element and a third diode, said auxiliary switching element permitting current flow in a single direction only, said third diode connected in parallel with said auxiliary switching element and having a polarity permitting current flow in a direction opposite to the single direction of current flow through said auxiliary switching element; and
  a second capacitor connected in series with said auxiliary switching circuit, the series connection of said second capacitor and said auxiliary switching circuit connected in parallel with the series connection of said switching circuit and said second reactor, such that said second capacitor and said second reactor constitute a resonance circuit, a resonance current generated by said resonance circuit flows through said second diode upon turning OFF of said primary switching element, and said switching network connected in parallel with the series circuit of said first reactor and the power source and in parallel with the series circuit of said first diode and said first capacitor, such that a direct current voltage applied to said first capacitor reaches a predetermined value for boosting the voltage from said direct current power source.

6. A DC-DC converter unit for dropping voltage from a direct current power source, comprising:
  a switching network adapted to form a series circuit with a direct current power source, said switching network comprising:
    (a) a primary switching element for turning ON and OFF a primary current, said primary switching element permitting flow of the primary current in a single direction only;
    (b) a first diode connected in parallel with said primary switching element with a polarity permitting current flow in a direction opposite to the single direction of current flow through said primary switching element, to constitute a switching circuit;
    (c) a first reactor connected in series with said switching circuit;
    (d) an auxiliary switching circuit including an auxiliary switching element and a second diode, said auxiliary switching element permitting current flow in a single direction only, and said second diode connected in parallel with said auxiliary switching element and having a polarity permitting current flow in a direction opposite to the single direction of current flow through said auxiliary switching element; and
    (e) a first capacitor connected in series with said auxiliary switching circuit, the series connection of said first capacitor and said auxiliary switching circuit connected in parallel with the series connection of said switching circuit and said first reactor, such that said first capacitor and said first reactor constitute a resonance circuit and a resonance current generated by said resonance circuit flows through said first diode upon turning OFF of said primary switching element;

a third diode connected in parallel with the series circuit of the direct current power source and said switching network; and a series circuit including a second reactor and a second capacitor and connected in parallel with said third diode, such that the direct current voltage applied to said second capacitor reaches a predetermined value for dropping the direct current voltage from said direct current power source.

7. A power factor enhanced power source unit comprising:

a first reactor;

a rectifier circuit having an input side and a direct current output side, for converting current from an alternating current power source connected to said input side into direct current at said direct current output side;

a switching network including:

(a) a primary switching element for turning ON and OFF a primary current, said primary switching element permitting flow of the primary current in a single direction only;

(b) a first diode connected in parallel with said primary switching element with a polarity permitting current flow in a direction opposite to the single direction of current flow through said primary switching element, to constitute a switching circuit;

(c) a second reactor connected in series with said switching circuit;

(d) an auxiliary switching circuit including an auxiliary switching element and a second diode, said auxiliary switching element permitting current flow in a single direction only, said second diode connected in parallel with said auxiliary switching element and having a polarity permitting current flow in a direction opposite to the single direction of current flow through said auxiliary switching element; and (e) a first capacitor connected in series with said auxiliary switching circuit, the series connection of said first capacitor and said auxiliary switching circuit connected in parallel with the series connection of said switching circuit and said second reactor, such that said first capacitor and said second reactor constitute a resonance circuit, a resonance current generated by said resonance circuit flows through said first diode upon turning OFF of said primary switching element, and said switching network being connected in parallel with a series circuit of said first reactor and said direct current output side of said rectifier; and a series circuit of a third diode and a second capacitor connected in parallel with said switching network, such that said switching circuit operates on the basis of a detection signal of the direct current voltage applied to said second capacitor, the direct current of the output of said rectifier, or a detection signal of an alternating current from the alternating current power source, for enhancing a power ratio of said alternating current power source.

* * * * *